US012734792B2

(12) United States Patent
Wang et al.

(10) Patent No.: US 12,734,792 B2
(45) Date of Patent: Sep. 15, 2026

(54) FULL POLYETHYLENE BLOWN FILM THROUGH DOUBLE BUBBLE PROCESS

(71) Applicant: ExxonMobil Chemical Patents Inc., Baytown, TX (US)

(72) Inventors: Xiao-Chuan Wang, Shanghai (CN); Zhi-Yi Shen, Shanghai (CN); Chao Liu, Shanghai (CN); Zhi Hui Zhang, Wuhan (CN); Qin Wang, Shanghai (CN)

(73) Assignee: ExxonMobil Chemical Patents Inc., Baytown, TX (US)

( * ) Notice: Subject to any disclaimer, the term of this patent is extended or adjusted under 35 U.S.C. 154(b) by 257 days.

(21) Appl. No.: 18/564,914

(22) PCT Filed: Jun. 8, 2022

(86) PCT No.: PCT/US2022/072821

§ 371 (c)(1),
(2) Date: Nov. 28, 2023

(87) PCT Pub. No.: WO2022/272208

PCT Pub. Date: Dec. 29, 2022

(65) Prior Publication Data

US 2024/0239091 A1 Jul. 18, 2024

Related U.S. Application Data

(60) Provisional application No. 63/202,734, filed on Jun. 22, 2021.

(51) Int. Cl.
*B32B 27/32* (2006.01)
*B29C 48/00* (2019.01)
(Continued)

(52) U.S. Cl.
CPC .......... *B32B 27/32* (2013.01); *B29C 48/0018* (2019.02); *B29C 48/022* (2019.02);
(Continued)

(58) Field of Classification Search
CPC .......................................... B32B 27/00–27/42
See application file for complete search history.

(56) References Cited

U.S. PATENT DOCUMENTS 3,456,044 A 7/1969 Pahlke
5,888,660 A 3/1999 Landoni et al.
(Continued)

FOREIGN PATENT DOCUMENTS

WO WO-2018106480 A1 * 6/2018 ........... B32B 27/327
WO WO-2019027524 A1 * 2/2019 ........... B32B 27/306
WO 20200190507 A1 9/2020

OTHER PUBLICATIONS

"Exceed 1018HA Metallocene Polyethylene Resin". ExxonMobil Chemical, (2014); pp. 1-2.*

(Continued)

*Primary Examiner* — Prashant J Khatri
(74) *Attorney, Agent, or Firm* — C. Tumey Law Group PLLC

(57) ABSTRACT

Provided herein are substantially all-poly ethylene films, and in particular blown biaxially oriented all-polyethylene films. The films can be multi-layer, and can be produced using a double bubble process. Particular multi-layer films include at least two skin layers, and al least one core layer disposed directly or indirectly between the at least two skin layers. The film composes: a narrow-composition-distribution metallocene linear low density' polyethylene (narrow-CD mLLDPE), a long-chain-branched metallocene linear low den- (Continued)

sity' polyethylene (LCB mLLDPE), and, optionally, either or both of a low density polyethylene (LDPE) and high density polyethylene (HDPE).

13 Claims, 1 Drawing Sheet

(51) Int. Cl.

| | |
|---|---|
| ***B29C 48/08*** | (2019.01) |
| ***B29C 48/21*** | (2019.01) |
| ***B32B 7/02*** | (2019.01) |
| ***B32B 27/08*** | (2006.01) |
| ***B32B 27/18*** | (2006.01) |
| *B29K 23/00* | (2006.01) |
| *B29K 105/16* | (2006.01) |

(52) U.S. Cl.

CPC .............. *B29C 48/08* (2019.02); *B29C 48/21* (2019.02); *B32B 7/02* (2013.01); *B32B 27/08* (2013.01); *B32B 27/18* (2013.01); *B29K 2023/0625* (2013.01); *B29K 2023/0633* (2013.01); *B29K 2023/065* (2013.01); *B29K 2105/16* (2013.01); *B32B 2250/242* (2013.01); *B32B 2250/40* (2013.01); *B32B 2270/00* (2013.01); *B32B 2307/518* (2013.01); *B32B 2307/54* (2013.01); *B32B 2307/5825* (2013.01); *B32B 2307/72* (2013.01); *B32B 2553/00* (2013.01)

(56) References Cited

U.S. PATENT DOCUMENTS

| | | | |
|---|---|---|---|
| 6,423,420 | B1 | 7/2002 | Brant et al. |
| 2006/0131778 | A1 | 6/2006 | Van Loon et al. |
| 2012/0164421 | A1 | 6/2012 | Shen et al. |
| 2014/0147646 | A1 | 5/2014 | Chen et al. |
| 2018/0272671 | A1 | 9/2018 | Ambroise |
| 2018/0354239 | A1 | 12/2018 | Hua et al. |
| 2022/0152906 | A1 | 5/2022 | Wang et al. |

OTHER PUBLICATIONS

"Enable 20-05HH Metallocene Polyethylene Resin". ExxonMobil Chemical, (2013); pp. 1-2.*

Bobovitch, A. L. et al., (2006) "Mechanical Properties Stress-Relaxation, and Orientation of Double Bubble Biaxially Oriented Polyethylene Films," J. Appl. Poly. Sci., v.100(5), pp. 3545-3553.

Chinese Office Action for CN Patent Application No. 202280036852.9 dated Aug. 2, 2025. English Translation with Original Untranslated Version, PDF file. 16 pages.

* cited by examiner

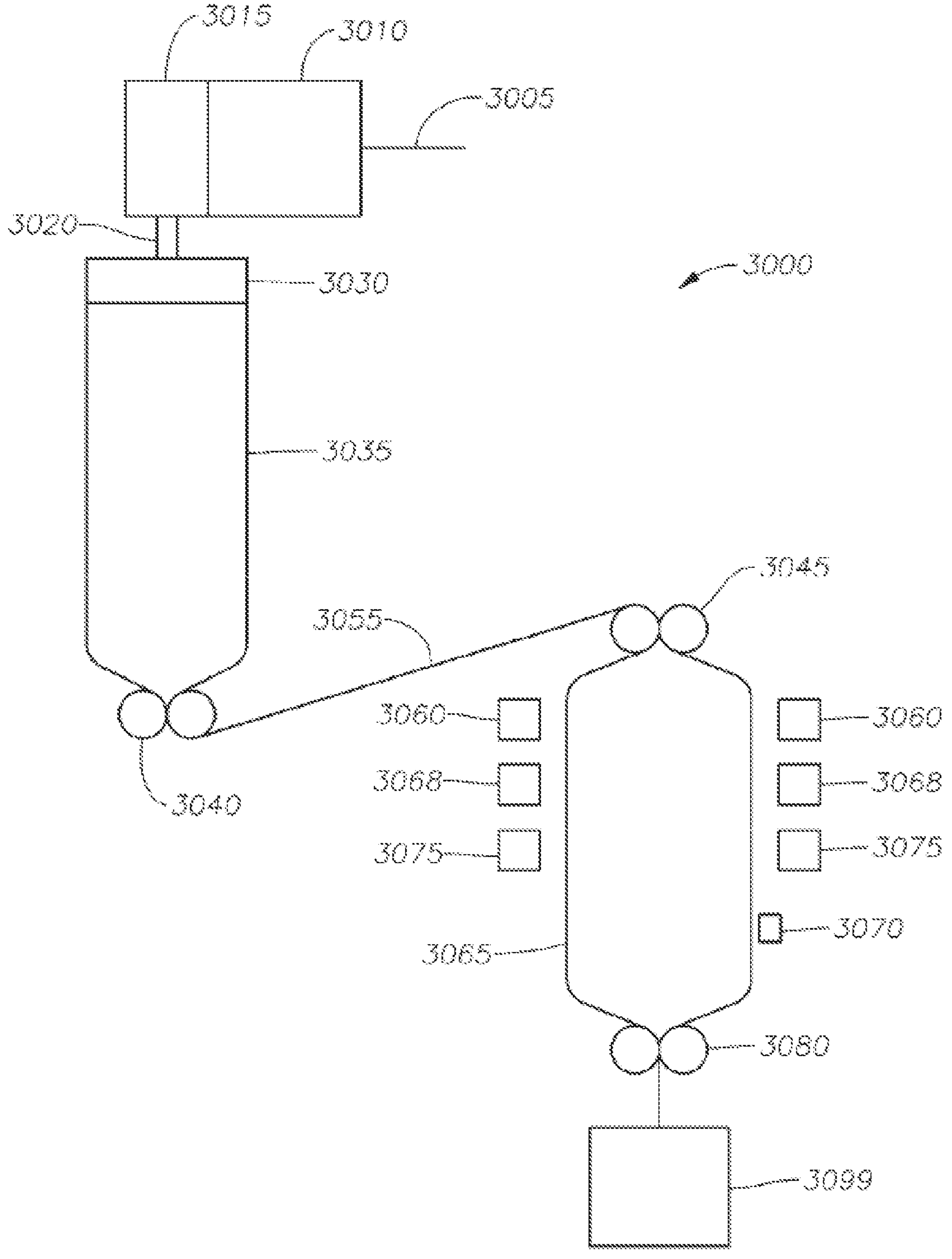
3015
3010
3005
3020
3000
3030
3035
3045
3055
3060
3060
3068
3068
3040
3075
3075
3070
3065
3080
3099

FULL POLYETHYLENE BLOWN FILM THROUGH DOUBLE BUBBLE PROCESS

CROSS-REFERENCE OF RELATED APPLICATIONS

This application is a National Phase Application claiming priority to PCT Application Serial No. PCT/US2022/072821, filed Jun. 8, 2022, which claims the benefit of U.S. Provisional Application 63/202,734 filed Jun. 22, 2021 "FULL POLYETHYLENE BLOWN FILM THROUGH DOUBLE BUBBLE PROCESS", the entireties of which are incorporated by reference, herein.

FIELD

The present disclosure relates to polyethylene compositions and films made therefrom, as well as systems and processes for forming such films.

BACKGROUND

Oriented films, and in particular biaxially oriented films, are desirable for many applications.

Historically, such films are made with a blend of materials, and in particular feature propylene-based polymers in biaxially oriented polypropylene (BOPP) films. For example, over 60% of the biaxially oriented film market is represented by polypropylene and obtained with sequential tenter process. The strength and success of biaxially oriented polypropylene films is due an excellent processability (broad stretching temperature profile, slow crystallization), good overall properties, attractive costs (high production speed), and good yield (low density).

More recently, however, interest has increased in developing simplified film solutions that utilize polyethylene, and preferably where substantially no polymers other than polyethylene or polyethylene-based polymers are present in the film layers (meaning that, for each polymer used in the film, the majority, preferably 75% or more, 90% or more, or even 98% or 99% or more, of the polymers used in the film are polyethylene or polyethylene-based copolymers). However, polyethylene tends to have a higher crystallinity than polypropylene, making it more difficult to downgauge and maintain a suitable balance of stiffness and toughness characteristics.

One means of achieving biaxially oriented films may provide a solution: the so-called double-bubble process. Again, however, polypropylene is the typical polymer employed in such processes. In the double-bubble process, a polymer film is extruded, blown into a first bubble, flattened back to a tube, then reinflated into a second bubble at a higher temperature, where the second bubble is stretched in a direction transverse to the direction of stretching/blowing of the first bubble. In this wav, biaxial orientation is imparted to the film.

The process can be complex to operate and require a great deal of precision; this problem is amplified when using all-polyethylene films, particularly when using polyethylene-based films that provide acceptable properties for the end-use film (e.g., mechanical and optical properties such as tensile force at break; elongation at break; tear strength; 1% secant modulus; and energy to break), such that heretofore there has been no generally acceptable all-PE film for a double-bubble process, leaving a substantial gap in all-PE film offerings.

Some references of potential interest in this area include: US Patent Publication Nos. 2006/0131778; 2012/0164421; 2014/0147646 as well as U.S. Pat. Nos. 3,456,044, 5,888,660, and 6,423,420; WIPO Publication WO2020/190507; and Bobovitch, A. L. et al., "Mechanical Properties Stress-Relaxation, and Orientation of Double Bubble Biaxially Oriented Polyethylene Films," *J. Appl. Poly. Sci.*, v.100(5), pp. 3545-3553 (2006).

SUMMARY

In some embodiments, the present disclosure provides polyethylene films, and in particular biaxially oriented polyethylene films. The film can include at least two skin layers, and at least one core layer disposed directly or indirectly between the at least two skin layers. The film in various embodiments comprises: a narrow-composition-distribution metallocene linear low density polyethylene (narrow-CD mLLDPE), a long-chain-branched metallocene linear low density polyethylene (LCB mLLDPE), and, optionally, either or both of a low density polyethylene (LDPE) and high density polyethylene (HDPE). The narrow-CD mLLDPE in various embodiments comprises 85 to 95 wt % units derived from ethylene and the balance derived from a $C_3$ to $C_{12}$ α-olefin (wt % based on total mass of polymer in the narrow-CD mLLDPE), and further has composition distribution breadth index (CDBI) of at least 50%, melt index ($I_2$, ASTM D1238 at 190° C., 2.16 kg load) within the range from 0.1 to 3.0 g/10 min, molecular weight distribution (MWD, Mw/Mn) within the range from 1.5 to 4, peak melting temperature within the range from 105° C. to 120° C., and Vicat softening temperature within the range from 70° C. to 130° C. The LCB mLLDPE in various embodiments comprises 80 to 99 wt % units derived from ethylene and the balance derived from a $C_3$ to $C_{12}$ α-olefin, and further has CDBI of at least 50%, 12 (190° C., 2.16 kg load) within the range from 0.1 to 0.7 g/10 min, g'(vis) within the range from 0.85 to 0.95, and MWD within the range from 2.5 to 5.5. The films can optionally further include a low density polyethylene (LDPE) and/or high-density polyethylene (HDPE).

In several embodiments, all or substantially all of the polymeric content of the films is composed of polyethylenes (homopolyethylene and/or polyethylene copolymers). Furthermore, the films can be made by a blown film process, preferably a double-bubble blown film process.

Also provided are formulations for making multilayer polymeric films. The formulations can include a skin formulation and a core formulation; one of the skin and core formulation can comprise a narrow-CD mLLDPE (such as those per the above description), and the other of the skin and core formulation can comprise a first LCB mLLDPE (such as those per the above description). Optionally, the formulation comprising the narrow-CD mLLDPE can further comprise a second LCB mLLDPE having one or more of the following properties different from the first LCB mLLDPE: density, peak melting temperature, and Vicat in softening temperature.

Even further embodiments include processes for making biaxially oriented multilayer polymeric films. Such processes include (a) extruding two or more polymeric formulations at an extruding temperature to form an extrudate; (b) inflating the extrudate the form a first bubble; (c) collapsing the first bubble to form a flattened tube; (d) heating the flattened tube; (e) inflating or expanding the flattened tube to form a second bubble; and (f) collapsing the second bubble to obtain the biaxially oriented multilayer polymeric film.

The polymeric formulations of (a) can comprise a skin formulation and a core formulation. One of the skin and the core formulation comprises a narrow-CD mLLDPE (e.g., per the narrow-CD mLLDPE described above), and the other of the skin and core formulation comprises an LCB mLLDPE (e.g., per the general description of LCB mLLDPE above). Further, the extruding (a) can include heating or pre-heating the polymeric formulation(s), e.g., to cause the formulation(s) to soften or melt, to aid in forming the first bubble. The heating (d) can be to a second bubble temperature, which can be higher than the first bubble temperature.

Also provided are films made by the aforementioned processes.

BRIEF DESCRIPTION OF THE DRAWING

FIG. 1 is an illustration of an exemplary double-bubble blown film formation system.

DETAILED DESCRIPTION

The present disclosure relates to polyethylene compositions and formulations thereof, more specifically to formulations of polyethylene compositions useful in making biaxially oriented films, and in particular through double-bubble processes. The present disclosure also includes methods for making such formulations, for forming the formulations into films, and to the associated films themselves. Thus, various embodiments include blends of two or more formulations, wherein each formulation is suitable for making a particular layer of multi-layer films; likewise, the corresponding multilayer films (comprising two or more layers corresponding to the aforementioned formulations) are also contemplated.

The films preferably are "substantially all-polyethylene films," meaning that polymers other than polyethylenes are substantially absent (such that of the total polymeric content of the film, at least 90 wt %, preferably at least 95, 96, or 97 wt %, more preferably at least 99 wt %, such as at least 99.9 wt %, or even 100 wt % of the polymeric content is polyethylene). Generally, where less than 100 wt % of the polymeric content is polyethylene, it may be due to a minor amount of polymeric adhesives, and/or polymer processing aids (PPAs) that may include polymeric compounds (e.g., oils, fluoropolymers and the like, described below in connection with PPAs), or other polymeric materials typically employed in such films are used; and/or due to the presence of a minor amount of impurities. In some contexts, a film having a conventional amount of PPA (e.g., 1 to 5 parts per hundred parts resin by weight (phr)) may alternatively be said to be such that the polymeric compounds of the film consist essentially of polyethylenes (while still also allowing for trace amounts of compounds (impurities, catalyst remnants, and the like) normally expected in polymeric films).

Further details of the polyethylene formulations, films, and methods for forming films are described below, following a listing of various definitions for use in reading this document.

Definitions

The term "polyethylene" refers to a polymer having at least 50 wt % ethylene-derived units, such as at least 70 wt % ethylene-derived units, such as at least 80 wt % ethylene-derived units, such as at least 85 wt % or at least 90 wt % ethylene-derived units; or at least 95 or even 100 wt % ethylene-derived units. The polyethylene can thus be a homopolymer or a copolymer, including a terpolymer, having one or more other monomeric units. A polyethylene described herein can, for example, include at least one or more other olefin(s) and/or comonomer(s).

An "olefin," alternatively referred to as "alkene," is a linear, branched, or cyclic compound of carbon and hydrogen having at least one double bond. For purposes of this specification and the claims appended thereto, when a polymer or copolymer is referred to as comprising an olefin, the olefin present in such polymer or copolymer is the polymerized form of the olefin. For example, when a copolymer is said to have an "ethylene" content of 50 wt % to 55 wt %, it is understood that the mer unit in the copolymer is derived from ethylene in the polymerization reaction and said derived units are present at 50 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. Accordingly, the definition of copolymer, as used herein, includes terpolymers and the like. "Different" as used to refer to mer units indicates that the mer units differ from each other by at least one atom or are different isomerically.

The term "alpha-olefin" or "$\alpha$-olefin" refers to an olefin having a terminal carbon-to-carbon double bond in the structure thereof $R^1R^2C{=}CH_2$, where $R^1$ and $R^2$ can be independently hydrogen or any hydrocarbyl group; such as $R^1$ is hydrogen and $R^2$ is an alkyl group. A "linear alpha-olefin" is an alpha-olefin wherein $R^1$ is hydrogen and $R^2$ is hydrogen or a linear alkyl group.

For the purposes of the present disclosure, ethylene shall be considered an $\alpha$-olefin.

When a polymer or copolymer is referred to herein as comprising an alpha-olefin (or $\alpha$-olefin), including, but not limited to ethylene, 1-butene, and 1-hexene, the olefin present in such polymer or copolymer is the polymerized form of the olefin. For example, when a polymer is said to have an "ethylene content", "ethylene-derived content", or "ethylene monomer content" of 80 to 99.9 wt %, or to comprise "ethylene-derived units" at 80 to 99.9 wt %, it is understood that the mer unit in the copolymer is derived from ethylene in the polymerization reaction and said derived units are present at 80 to 99.9 wt %, based upon the weight of ethylene content plus comonomer content.

As used herein, and unless otherwise specified, the term "$C_n$" means hydrocarbon(s) having n carbon atom(s) per molecule, wherein n is a positive integer.

Multilayer Film Structures

In various embodiments, the present disclosure describes multilayer films. The films herein comprise at least two general kinds of layers (each of which is described in more detail below): core layers B, formed from core formulations as described herein; and skin layers A, formed from skin formulations as described herein. Films may be referred to, for example, as A/B/A, meaning the film structure is a three-layer film, such that a core layer B is disposed between two skin layers A. Similarly, a five-layer film may be referenced, in which structure may be A/B/A/B/A, or A/A/B/A/A, or A/B/B/B/A, etc. Six, seven, and more layers are also contemplated.

Thus, generally speaking, multilayer films according to various embodiments described herein may comprise any combination of skin layers A and core layers B as described herein, and in any order, provided that a skin layer A forms each outer layer of the film (e.g., the film is of A/ . . . /A structure), and further provided at least one core layer B is disposed between the outer skin layers A. Further, unless specified otherwise by context herein, each skin layer A of the multilayer films may be the same (e.g., formed from the same or identical skin formulation) or different (e.g., different skin layers such that each skin layer is, individually, within the description of a skin layer A as provided herein), and likewise for core layers B in film structures comprising multiple core layers B. In some particular contexts, in where it is specifically contemplated that the skin layers A will be different, reference can be made to A' (for a second, different, skin layer A), to A" (for a third skin layer A different from each of the first two), etc., and likewise for B', B", etc. with regards to core layers B. Furthermore, although skin layers A form outer layers, they may also be employed in interior layers (e.g., in an A/B/AB/A structure).

Particularly preferred embodiments include three-layer films AB/A, such that the films comprise a core layer disposed between two skin layers. The skin layers may be the same (A/B/A, where the As are the same) or different (A/B/A'). Other preferred embodiments include five layer films (e.g., A/B/A/B/A, A/B/B/B/A, A/B/A/A/A, etc., wherein the outer layers are skin layers A and at least one inner layer is a core layer B; and any A layer may be the same or different as compared to other A layers; and any B layer likewise may be the same or different as compared to other B layers); although films having more than 5 layers are also contemplated, wherein the outer layers are skin layers A (which may be the same or different) and at least one inner layer is a core layer B.

Polyethylenes (and formulations thereof) suitable for forming the various layers are described in more detail below. The polyethylenes may be suitable for deployment in either a skin layer A or core layer B, although in some cases, as noted below, certain of the polyethylenes can be preferred for deployment in a particular layer A or B. The components suitable for each layer (and/or a formulation for making each layer) are described after the polyethylenes and optional additives. Moreover, as noted above, the films described herein (and corresponding formulations for forming them) are advantageously "substantially all-polyethylene films," having the meaning described above. Thus, the films may sometimes be referred to as "all-PE films," and their formulations correspondingly as "all-PE formulations."

Narrow-CD mLLDPE

A particularly suitable polyethylene for skin layers A and/or core layers B (or associated respective skin and/or core formulations) includes linear low density polyethylene (LLDPE), and in particular a flat composition distribution metallocene-catalyzed LLDPE (mLLDPE) that is a copolymer of 80 to 99.9 wt % ethylene-derived units, with the balance of units derived from one or more $C_3$ to $C_{12}$ α-olefin comonomer (and in particular one or more of butene, hexene, octene; preferably one of those; and more preferably hexene). The wt % is based on total mass of ethylene-derived units plus comonomer-derived units in the polyethylene. Such polyethylenes are referred to as "flat composition distribution" in recognition that comonomer is incorporated in relatively equal amounts (by wt %) in shorter vs. longer molecular-weight chains within the polymer. These also may be referred to as "narrow-CD" or "narrow-composition-distribution" polyethylenes; or, equivalently, high-CDBI mLLDPEs. Composition distribution refers to the distribution of comonomer among polymer chains of different length (different molecular weight), and CDBI refers to Composition Distribution Breadth Index, which is defined as the weight percent of the copolymer molecules (chains) having a comonomer content within 50% of the median total molar comonomer content, and it is described in U.S. Pat. No. 5,382,630, which is hereby incorporated by reference. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.*, vol. 20, p. 441 (1982) and U.S. Pat. No. 5,008,204, which are incorporated herein by reference. Thus, a higher value of CDBI indicates a narrow composition distribution (meaning that comonomer is distributed relatively evenly across polymer chains of different molecular weight).

The narrow-CD polyethylene may have CDBI of at least 50%, more preferably at least 60%, such as within the range from 50 to 90%, or 60 to 80%.

A narrow-CD polyethylene may more particularly have ethylene-derived content within the range from a low of any one of 80, 85, 86, 87, 87.5, 88, 90, 91, 92, 93, 94 or 95 wt % to a high of any one of 88, 90, 93, 94, 95, 96, 97, 98, 99, or 99.9 wt %; with ranges from any foregoing low to any foregoing high contemplated, provided the high end is greater than the low end (e.g., 85 to 95 wt %, such as 86 to 92 wt % ethylene-derived units; or 94 to 99 wt % ethylene-derived units). The balance is comprised of the $C_3$ to $C_{12}$α-olefin comonomer-derived units (e.g., hexene).

The narrow-CD mLLDPE can provide reduced softening point relative to formation processes, and furthermore provide excellent sealing, optical, and mechanical properties to a film made therefrom. The narrow-CD mLLDPE preferably also has one or more, preferably all, of the following further properties:

- Peak melting temperature within the range from 105 to 120° C., preferably 110° C. or 111° C. to 115° C. or 116° C. Peak melting temperature, also referred to herein by the shorthand "melting point" is determined by using a differential scanning calorimeter (DSC). DSC measurements can be carried out with a TA DSC8000 instrument under $N_2$ atmosphere with a heating/cooling rate of 10 K/min. The samples are heated from −50 to 300° C., held for 5 minutes in order to remove the previous thermal history, then cooled down to −50° C., and then heated again to 300° C.
- Vicat softening temperature (ASTM D1525) within the range from softening point within the range from 70° C. to 130° C., preferably 90° C. to 110° C., such as from a low of any one of 70, 75, 80, 85, 90, 95, 96, 97, 98, 99, or 100° C. to a high of any one of 100, 101, 102, 103, 104, 105, 110, 115, 120, 125, or 130° C. (with ranges from any foregoing low to any foregoing high contemplated, provided the high is greater than the low, e.g., 90° C. to 110° C. or 97° C. to 103° C.).
- Melt index (MI, also referred to as $I_2$ or $I_{2.16}$ in recognition of the 2.16 kg loading used in the test) within the range from 0.1 to 5.0 g/10 min (ASTM D1238, 190° C., 2.16 kg load), such as from a low of any one of 0.1, 0.2, 0.3, 0.4, 0.5, 0.7, or 0.8 g/10 min to a high of any one of 1.0, 1.1, 1.2, 1.5, 2.0, 2.5, 3.0, 3.5, 4.0, 4.5, or 5.0 g/10 min; with ranges from any foregoing low end to any foregoing high end also contemplated.
- Long chain branching index (LCB Index, also referred to herein as g'(vis) or g' index) greater than 0.95, preferably greater than or equal to 0.96 or 0.97.

The narrow-CD mLLDPE can also have one or more, preferably all of the following:

- Weight average molecular weight (Mw) within the range from 45,000 to 120,000 g/mol, such as from 50,000 to 115,000 g/mol or 60,000 to 110,000 g/mol (with ranges from any foregoing low end to any foregoing high end also contemplated. e.g., 45,000 to 110,000 g/mol);
- Number average molecular weight (Mn) within the range from 20,000 to 55,000 g/mol, such as within the range from 25,000; 30.000; 35,000; or 40.000 to a high of 30,000; 35,000; 40,000; 45,000; 50,000; or 55,000 g/mol, with ranges from any foregoing low end to any foregoing high end also contemplated (provided the high end is greater than the low end), e.g., from 35,000 to 55,000 g/mol;
- Molecular weight distribution (MWD) within the range from 1.5 or 2.0 to 3.5 or 4;
- Density (ASTM D1505) within the range from 0.905 to 0.940 g/cm$^3$, such as within the range from a low end of any one of 0.905, 0.910, 0.911, 0.912, or 0.915 g/cm$^3$ to a high end of any one of 0.913, 0.914, 0.915, 0.920, 0.925, 0.926, 0.928, 0.930, 0.935, or 0.940 g/cm$^3$, with ranges from any foregoing low end to any foregoing high end contemplated (provided the high end is greater than the low end), e.g., 0.910 to 0.915 g/cm$^3$;

Examples of suitable polyethylenes for the narrow-CD mLLDPE include Exceed™ performance polyethylenes available from ExxonMobil Chemical Company, as well as other commercially available mLLDPEs such as Evolue™ SP1510, available from Prime Polymer Co., Ltd.

The distribution and the moments of molecular weight (Mw, Mn, Mz, Mw/Mn, Mz/Mn, etc.) and the monomer/comonomer content ($C_2$, $C_4$, $C_6$ and/or $C_8$, and/or others, etc.), as well as g'(vis), for the above-described polyethylenes as well as any other polyethylene described herein, are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10 μm Mixed-B LS columns are used to provide polymer separation. Detailed analytical principles and methods for molecular weight determinations and g'(vis) are described in paragraphs [0044]-[0051] of PCT Publication WO2019/246069A1, which are incorporated herein by reference (noting that the equation c=/// referenced in Paragraph [0044] therein for concentration (c) at each point in the chromatogram, is $c=\beta I$, where $\beta$ is mass constant and I is the baseline-subtracted IR5 broadband signal intensity (I)). Unless specifically mentioned, all the molecular weight moments used or mentioned in the present disclosure are determined according to the conventional molecular weight (IR molecular weight) determination methods (e.g., as referenced in Paragraphs [0044]-[0045] of the just-noted publication), noting that for the equation in such Paragraph [0044], $\alpha=0.695$ and K=0.000579(1-0.75 Wt) are used, where Wt is the weight fraction for comonomer, and further noting that comonomer composition is determined by the ratio of the IR5 detector intensity corresponding to $CH_2$ and $CH_3$ channel calibrated with a series of PE and PP homo/copolymer standards whose nominal values are predetermined by NMR or FTIR (providing methyls per 1000 total carbons ($CH_3$/1000 TC) as noted in Paragraph [0045] of the just-noted PCT publication). Other parameters needed can be found in the referenced passage in the WO2019/246069A1 publication, but some are included here for convenience: n=1.500 for TCB at 145° C.; I=665 nm; dn/dc=0.1048 ml/mg.

It is believed that narrow-CD mLLDPEs according to the above description, when employed in a film, provide excellent sealing, toughness, and puncture performance. In addition, they provide benefits to orientation processes such as the double-bubble formation process insofar as they impart relatively lower melting and softening points to the composition, helping with bubble formation and stability (particularly in combination with one or more of the other polyethylene(s), discussed below).

In particular embodiments, the narrow-CD mLLDPE can be deployed in a skin layer (or corresponding skin formulation), where the imparted properties just noted may be particularly suitable. However, narrow-CD mLLDPE can likewise be deployed in a core layer in various embodiments, and in some instances, it could be present in at least one core layer and at least one skin layer of films according to various embodiments herein.

Long-Chain-Branched mLLDPEs

Core formulations in accordance with various embodiments as described herein are particularly suitable for forming one or more core layers B in the multilayer films of the present disclosure.

Core formulations in general can include one or more polyethylenes; preferably, in the core formulation, polymers other than polyethylenes are substantially absent. One or more of the below-described polyethylenes are particularly suitable for core formulations.

Other suitable polyethylenes for film formulations herein include those imparting high bubble stability (e.g., in a blown film process such as a double-bubble process), preferably while still imparting suitable film performance properties. For example, the core or the skin formulation (or both) can include one or more long-chain branched (LCB) mLLDPEs. (It is noted that these mLLDPEs are considered long-chain-branched as compared to other linear low-density polyethylenes, and in particular as compared to other metallocene LLDPEs; whereas their total long-chain branching will still be less than LDPEs with very high degrees of long-chain branching.) It is believed that such LCB mLLDPEs may contribute high bubble stability, potentially even where melting point is not substantially different from polyethylenes in other layers, which is surprising in the context of double-bubble processes, which are often thought to rely on melting point differences between polypropylene and other layers in conventional formulations. Nonetheless, in some instances, both melting point differences and LCB may be present in certain LCB mLLDPEs.

LCB mLLDPEs can, for instance, have LCB Index or g'(vis) within the range from 0.80 to less than 0.97, such as within the range from 0.85 to 0.95.

LCB mLLDPEs, like the above-described narrow-CD mLLDPEs, are preferably copolymers of 80 to 99.9 wt % ethylene-derived units, with the balance derived from one or more $C_3$ to $C_{12}$ $\alpha$-olefins (and in particular one or more of butene, hexene, octene; preferably one of those; and more preferably hexene). The wt % is based on total mass of ethylene-derived units plus comonomer-derived units in the polyethylene.

LCB mLLDPEs preferably have CDBI greater than or equal to 50%, preferably greater than or equal to 70%, such as within the range from a low of any one of 50, 60, or 70% to a high of 80, 85, 90, 95, or 99%, with ranges from any foregoing low end to any foregoing high end contemplated.

LCB mLLDPEs further can have MWD (Mw/Mn) within the range from 2.5 to 5.5, such as within the range from 3 or 3.5 to 4.5 or 5.

Furthermore, LCB mLLDPEs can have Melt Index ($I_2$, determined per ASTM D1238 at 190° C., 2.16 kg load) within the range from 0.1 to 0.7 g/10 min, such as within the range from a low of any one of 0.1, 0.15, 0.2, or 0.22 to a high of any one of 0.22, 0.25, 0.26, 0.27, 0.30, 0.40, 0.45, 0.50, 0.60, or 0.70 g/10 min; with ranges from any foregoing low end to any foregoing high end also contemplated (provided the high end is greater than the low end), e.g., from 0.15 to 0.30 g/10 min; or 0.15 to 0.27 g/10 min.

In addition, some variations of LCB mLLDPEs are contemplated herein. A first LCB mLLDPE variant exhibits high stiffness and excellent processability, but lower toughness. In addition to the properties noted above (common to these LCB mLLDPE variants), such first LCB mLLDPE variants may have one or more, preferably all, of the following properties:

- Peak melting temperature (determined by DSC as described above) within the range from 115° C. to 135° C., preferably 120° C., 121° C., 123° C. or 125° C. to 130° C. or 133° C.;
- Vicat softening temperature within the range from 110 to 130° C., such as 115° C. to 125° C., or from a low of any one of 110, 115, 118, 119, or 120° C. to a high of any one of 123, 124, 125, 127, 130, or 135° C., with ranges from any foregoing low to any foregoing high contemplated (e.g., 115° C. to 125° C.); and
- Density within the range from 0.930 to 0.950 g/cm$^3$, such as from a low of any one of 0.935, 0.936, 0.937, or 0.938 g/cm$^3$ to a high of any one of 0.942, 0.943, 0.944, 0.945, or 0.950 g/cm$^3$, with ranges from any forgoing low to any foregoing high contemplated herein (e.g., 0.935 to 0.945 g/cm$^3$).

Examples of commercial LCB mLLDPE according to such variants include Enable™ brand polyethylene from ExxonMobil Chemical Company, such as Enable™ 4002 performance polyethylene.

The second LCB mLLDPE variant can exhibit a superior balance of both toughness and stiffness, while still offering excellent processability, and having lower density than the first LCB mLLDPE variant. Such second LCB mLLDPE variants can have one or more, preferably all, of the following properties:

- Peak melting temperature (determined by DCS as described above) within the range from 100° C. to 115° C., such as 105° C. to 115° C., or within the range from a low of any one of 100, 105, 106, or 107° C. to a high of any one of 110, 111, 112, 113, 114, or 115° C. (with ranges from any foregoing low to any foregoing high contemplated, e.g., 106° C. to 112° C.);
- Vicat softening temperature within the range from 95° C. to 110° C., such as from a low of any one of 95, 97, 98, 99, or 100° C. to a high of any one of 105, 106, 107, 108, 109, or 110° C. with ranges from any foregoing low to any foregoing high contemplated (e.g., 100 to 105° C.); and
- Density within the range from 0.910 to 0.929, such as from a low of any one of 0.910, 0.911, 0.912, or 0.913 g/cm$^3$ to a high of any one of 0.919, 0.920, 0.921, 0.922, 0.923, 0.925, 0.927, or 0.929 g/cm$^3$, with ranges from any foregoing low to any foregoing high contemplated (e.g., 0.910 to 0.925 g/cm$^3$, such as 0.913 to 0.919 g/cm$^3$).

Examples of commercial LCB mLLDPE according to the second variant (e.g., second LCB mLLDPE) include Exceed™ XP 6000 series performance polyethylene from ExxonMobil Chemical Company, such as Exceed™ XP 6026 performance polyethylene.

LDPE

In various embodiments, either or both of the skin formulation A and the core formulation B (and corresponding skin layer(s) A and/or core layer(s) B) can include an LDPE, and especially LDPE homopolymer, in combination with either of the mLLDPE(s) discussed above, e.g., for aiding with bubble stability in blown film processes.

In many embodiments, the LDPE is not particularly limited. As the ordinarily skilled artisan will recognize, LDPE is typically formed through free radical polymerization (e.g., high pressure polymerization in tube and/or autoclave reactors), and has a high degree of long chain branching (preferably with g'<0.70, <0.60, or even <0.55). Further, LDPE according to some embodiments can have density within the range from 0.915 to 0.930; and/or melt index (MI, 190° C. 2.16 kg) within the range from 0.1 to 4.0, such as 0.1 g/10 min to 1.0 g/10 min, or 0.1 to 0.5 g/10 min (with ranges from any foregoing low to any foregoing high contemplated). In certain embodiments, MI may be fractional, e.g., less than 1.0, such as less than any one of 0.9, 0.8, 0.7, 0.6, or 0.5 g/10 min.

HDPE

In various embodiments, one or more HDPEs can be employed in a skin layer A and/or a core layer B (and/or in corresponding skin/core formulations, respectively). A wide variety of HDPE would be suitable, and in many embodiments employing HDPE, the HDPE is not particularly limited to properties other than density greater than or equal to 0.935 g/cm$^3$, preferably greater than or equal to 0.940 g/cm$^3$, 0.945 g/cm$^3$, 0.950 g/cm$^3$, or even 0.955 g/cm$^3$, such as within the range from a low of any one of 0.935, 0.940, 0.945, 0.950, or 0.955 g/cm$^3$ to a high of any one 0.956, 0.960, 0.962, 0.965, 0.967, or 0.970 g/cm$^3$, with ranges from any foregoing low to any foregoing high contemplated (e.g., 0.955 to 0.970 g/10 min).

However, HDPE of some embodiments may additionally have one or more of the following properties: melt index ($I_{2.16}$, 190° C., 2.16 kg load) within the range from 0.1 to 1.5 g/10 min, preferably 0.5 to 1.0 g/10 min; melt index ratio (the ratio of high-load melt index, or $I_{21.6}$ (measured at 190° C., 21.6 kg load) to $I_{2.16}$) within the range from 35 or 40 to 50 or 60 g/10 min; and Vicat Softening temperature within the range from 120° C. to 150° C., such as within the range from 125° C. to 135° C. or 140° C. The HDPE can have both of these additional properties. Incorporation of HDPE in either skin layers (or formulations), or core layer (or formulation) can help provide a softening temperature gap between the core and skin layers, which can be helpful in the film formation process as already noted.

Suitable HDPEs include PE homopolymers as well as ethylene-α-olefin copolymers (where the α-olefin may be any of those discussed above in connection with mLLDPEs), and they may be produced by any suitable process known to those skilled in the art, e.g., gas-phase fluidized bed polymerization or slurry polymerization, or a combination thereof (e.g., in the case of reactor or other bimodal HDPE compositions, which may be produced in two or more series reactors).

Polymer Processing Additives

In addition to the polyethylenes of the various layers/formulations, a polymer processing additive or polymer processing aid (PPA) can optionally be included in any one or more formulations/layers in typical amounts. For instance, any layer can comprise 0 to 5 phr (parts per hundred parts resin) of PPA, such as within the range from 0, 1, or 2 phr to 3, 4, or 5 phr, with ranges from any foregoing low to any foregoing high contemplated.

Suitable PPAs include any known PPA, such as fluoropolymers, oils, other lubricating compounds, and the like, with DYNAMAR™ PPAs from 3M being a particular example, although other PPAs may also or instead be used.

Layer Formulations and Layer Compositions

As noted previously, multilayer films according to various embodiments herein comprise at least one skin layer A and at least one core layer B; preferably at least two skin layers and at least one core layer (e.g., A/B/A, or A/ . . . /A where at least one intermediate layer is a core layer B).

The multilayer films generally include (1) a narrow-CD mLLDPE in one or more of the layers; and (2) an LCB mLLDPE in one or more of the layers. Optionally, the film further includes LDPE and/or HDPE in one or more of the layers; and optionally, the film further includes PPA in one or more of the layers.

Films according to several embodiments employ the narrow-CD mLLDPE in skin layer(s) and LCB mLLDPE(s) in core layer(s) (and corresponding skin and core formulations, respectively). Any layer/formulation can also include either or both of LDPE and HDPE; and likewise any layer/formulation can include PPA.

In such embodiments, then, the skin layer A can comprise from 50 to 100 wt % of the narrow-CD mLLDPE (or a blend of two or more narrow-CD mLLDPEs), based on mass of total polymers in the formulation or layer, as applicable. More particularly, the skin formulation A and/or corresponding skin layer A comprises the narrow-CD mLLDPE (or a blend of two or more narrow-CD mLLDPEs) in a range from a low of any one of 50, 55, 60, 65, 68, and 70 wt % to a high of any one of 72, 75, 80, 85, 90, 95, and 100 wt/o, with ranges from any foregoing low end to any foregoing high end (e.g., 65 to 75 wt %) contemplated herein. In particular embodiments, the balance of material in the skin formulation A and/or skin layer A (other than PPA, discussed below) can be comprised of LDPE and/or HDPE, such that the skin formulation/layer comprises from 50, 60, or 65 wt % to 75, 80, or 85 t % of the narrow-CD mLLDPE and from 15, 20, or 25 wt % to 35, 40, or 50 wt % of the LDPE and/or HDPE (such wt % representing combined total of LDPE and HDPE when both are employed).

Further, the core layer B and/or core formulation B of such embodiments can comprise from 50 to 100 wt % of the LCB mLLDPE (or a blend of two or more LCB mLLDPEs) in the formulation or layer, as applicable. More particularly, the core formulation B and/or corresponding core layer B comprises the LCB mLLDPE (or a blend of two or more LCB mLLDPEs) in a range from a low of any one of 50, 55, 60, 65, 68, and 70 wt % to a high of any one of 72, 75, 80, 85, 90, 95, and 100 wt %, with ranges from any foregoing low end to any foregoing high end (e.g., 60 to 85 wt %, such as 65 to 75 wt %, or 75 to 85 wt %) contemplated herein. In particular embodiments, the balance of material in the core formulation B and/or core layer B (other than PPA, discussed below) can be comprised of LDPE and/or HDPE, such that the skin formulation/layer comprises from 50, 60, or 65 wt % to 75, 80, or 85 wt % of the LCB mLLDPE (or blend of two or more LCB mLLDPEs) and from 15, 20, or 25 wt % to 35, 40, or 50 wt % of the LDPE and/or HDPE (such wt % representing combined total of LDPE and HDPE when both are employed).

In certain embodiments wherein a blend of two LCB mLLDPEs is employed in the core formulation B and/or corresponding core layer B, the first LCB mLLDPE (e.g., in accordance with the first LCB mLLDPE variant discussed above) may be present in an amount ranging from a low of any one of 10, 15, 18, or 20 wt % to a high of any one of 22, 24, 25, 30, 45, 50, or 55 wt %, with ranges from any foregoing low end to any foregoing high end also contemplated; and the second LCB mLLDPE (e.g., in accordance with the second LCB mLLDPE variant discussed above) may be present in an amount ranging from a low of any one of 30, 35, 40, 45, 50, 55, 60, 65, 70, 75, or 80 wt % to a high of any one of 40, 45, 50, 55, 60, 65, 70, 75, 80, 85, or 90 wt %, with ranges from any foregoing low to any foregoing high contemplated, provided the high end is greater than the low end (e.g., 10 to 45, such as 15 to 25 wt % of the first LCB mLLDPE and 55 to 90, such as 75 to 85 wt/o of the second LCB mLLDPE). In some embodiments, a 50/50 blend of the two LCB mLLDPEs can be employed; in other embodiments, a blend comprising more of the second LCB mLLDPE than the first LCB mLLDPE can be employed. In yet other embodiments, a blend of 25 to 35 wt % of the first LCB mLLDPE with 35 to 45 wt/o of the second LCB mLLDPE can be employed.

In a subclass of films (and/or formulations) according to these embodiments, an LCB mLLDPE can be included in the skin formulation A (and/or corresponding skin layer A) in addition to the narrow-CD mLLDPE. In such embodiments, the skin layer/formulation includes 20-50 wt % of the narrow-CD mLLDPE, 20-50 wt % of the LCB mLLDPE according to second variant discussed above (having lower density and greater balance of stiffness/strength and processability), and the balance (if any) comprising optional LDPE and/or HDPE. In certain of these embodiments, more LCB mLLDPE is included in the skin layer/formulation A than narrow-CD mLLDPE. Furthermore, in such embodiments, the LCB mLLDPE employed in the core layer/formulation B can be either LCB mLLDPE type, but preferably is according to the first variant of LCB mLLDPE discussed above (having higher density than the second variant of LCB mLLDPE).

Yet further film and/or formulation embodiments include the narrow-CD mLLDPE(s) in the core layer/formulation B, and the LCB mLLDPE(s) in the skin layer/formulation A. The amounts of each type of polyethylene in each layer are within the ranges discussed above, except the LCB mLLDPE is in the skin layer/formulation A instead of the core layer/formulation B; and the narrow-CD mLLDPE9s) are in the core layer/formulation in B instead of the skin layer/formulation A. Likewise, either layer type can include the amounts of LDPE and/or HDPE per above discussion. And, as per above, a subclass of these embodiments can include a blend of the narrow-CD mLLDPE and the second-variant LCB mLLDPE in the same layer or formulation (in these embodiments, in the core layer/formulation B), the blend comprising 20-50 wt % of the narrow-CD mLLDPE, 20-50 wt % of the LCB mLLDPE according to second variant discussed above (having lower density and greater balance of stiffness/strength and processability), and the balance (if any) comprising optional LDPE and/or HDPE. And, the core layer/formulation of such embodiments can include more of the LCB mLLDPE than the narrow-CD mLLDPE.

Additionally, in all embodiments discussed above, either or both of the skin formulation A and/or core formulation B (and/or corresponding skin and core layers) can include 5 phr of PPA or less, such as 4 phr or less, 3 phr or less, 2 phr or less, or 1 phr or less. Certain embodiments have no PPA in either a skin or core layer; others have PPA only in the skin layers; and yet others have PPA in each of the skin and core layers. Amount of PPA is described herein in terms of phr (parts per hundred parts resin), based on the amount (mass) of non-PPA polymeric material (polyethylenes) in the formulation/layer (e.g., LLDPE plus LDPE plus HDPE). Furthermore, all wt % s recited above for polyethylenes in the various layers and/or formulations are on the basis of the amount (mass) of polyethylenes in the layer/formulation, excluding the PPA. Preferably, other than optional PPA, no polymeric material other than the polyethylenes is included in each layer/formulation. And in many cases, no PPA is included, such that no polymeric material other than the polyethylenes is present in the layer/formulation (and therefore in a film made therefrom).

Furthermore, a wide variety of layer distributions are contemplated herein. For instance, skin layers can each comprise from 5, 10, 15, 25 to 20, 25, 30, 35, 40, or 45 wt % of the film (with ranges from any foregoing low to any foregoing high contemplated, provided the high end is greater than the low end), with the balance formed by core layer(s). As a particular example, in 3 layer A/B/A films, the skin layers A can each form from 10 to 35 wt % of the film, such as from 10 to 20 wt % or 25 to 35 wt %, with the balance formed by the core layer B. Thus, 15/70/15 films and 30/40/30 films are contemplated within the foregoing.

Double Bubble Films

In various embodiments, substantially all-PE polymeric formulations in accordance with the above descriptions are formed into oriented multilayer films, preferably biaxially oriented multilayer films.

In particularly preferred embodiments, substantially all-PE polymeric formulations in accordance with the above descriptions are coextruded together to form a collective extrudate, and the collective extrudate is then oriented. Preferably, the collective extrudate is biaxially oriented, and most preferably it is oriented through a double-bubble blown film process, to obtain a biaxially oriented film.

Employing skin and core formulations in accordance with the above can enable production of superior biaxially oriented polyethylene (BOPE) films through the double-bubble process. It is believed that the selection of core and skin formulations in accordance with the above description achieves a desirable balance of melt strengths and melting/softening point differences to maintain stability of the bubbles formed during the double-bubble orientation process. Thus, utilizing formulations as described herein, one can achieve biaxially oriented films having acceptable or even superior properties, while arriving at a substantially all-PE solution.

An exemplary double-bubble process to obtain a biaxially oriented film in accordance with various embodiments is described below. This process, as noted, can be applied to each of multiple polymeric film formulations (e.g., each of several layer) for later combining; or it can be applied to a collective extrudate (e.g., where each of multiple layers is coextruded to then be progressed through biaxial orientation). The below description is written in the latter context (e.g., assuming that all layers are coextruded to form the multi-layer collective extrudate for biaxial orientation).

The double-bubble orientation process in general can comprise: (a) extruding or coextruding one or more polymeric formulations to form an extrudate; (b) inflating or expanding the extrudate to form a first bubble; (c) collapsing the first bubble to form a flattened tube; (d) heating the flattened tube; (e) inflating or expanding the flattened tube to form a second bubble; and (f) collapsing the second bubble to obtain the biaxially oriented film. MD and TD orientation preferably occurs in both bubbles, but typically the second bubble includes a greater blow-up ratio than that of the first bubble, resulting in the film with the desired extent of biaxial orientation.

A double-bubble process according to various embodiments can be more specifically described with reference to FIG. 1. FIG. 1 is a schematic illustrating an exemplary double-bubble extrusion system 3000. As shown with respect to (a) extruding or coextruding one or more polymeric formulations to form an extrudate: a formulation (e.g., a skin formulation or a core formulation per those described above) is fed alone through a feed line 3005 into extruder 3010 to form an extrudate. Alternatively, multiple formulations (e.g., a skin formulation and a core formulation, or in particular embodiments, two skin formulations and a core formulation) may be fed to the extruder 3010, through multiple feed lines (not shown) or they may be combined and fed through feed line 3005. Arrangements other than feed lines for feeding one or more formulations are also contemplated, such as any arrangement known in the art. For instance, also contemplated are gravimetric feeding systems in which the extruder can be equipped with one or more feeding hoppers; further, where multiple hoppers are used, blending for the extruder can take place in a mixing hopper mounted below the feeding hoppers, from which the blend is discharged into the extruder 3010.

The extrudate (whether formed from a formulation or a blend of formulations fed to the extruder 3010) is forced through die assembly 3015 (which can include, e.g., a die, a screen changer, and an adapter, wherein the extruder is connected to the die via the screen changer and adapter). The melt flows of the extrudate are shaped in the die through one or more annular gaps, and are forced out such that the extrudate is expelled as an extrudate tube 3020. A single extruder and die assembly are shown in FIG. 1 for the sake of simplicity; however, multiple extruders may be connected to a single die, e.g., such that each extruder is connected to a die via a screen changer and adapter so that the die can intake extrudate flows from one or more of the connected extruders, and expel a combined extrudate (or coextrudate).

The extrudate tube 3020 will preferably have the basic composition of a film to be formed in the process; thus, for a process in which a multilayer film is formed, multiple formulations (each formulation preferably corresponding to a layer of the film) may be (a) fed into a single extruder and coextruded into and through the die assembly; or (b) each may be fed through a respective extruder and then to a collective die, and collectively extruded into the extrudate tube 3020. For example, to make a three-layer film comprising a core layer sandwiched between two skin layers, one preferably would feed a core formulation and two skin formulations (each in accordance with those described above)—whether by coextruding all of these through a single extruder 3010, or by extruding the skin layers through one extruder and extruding the core layer through a second extruder, thus forming the coextrudate in a common die, which coextrudate is then expelled as the extrudate tube 3020. All of these and other forms of forming a coextrudate are contemplated herein, and the resulting composition (made from multiple formulations) for feeding to the remaining portion of the film-making process is herein referred to as a "coextrudate." however formed. Further, unless context clearly expresses otherwise, an "extrudate" as used herein is intended to reference the general case, including both a single formulation extrudate, and a multi-formulation extrudate or "coextrudate."

Further with respect to the extrusion, the formulation(s) can be preheated and/or heated within the extruder(s) to a temperature suitable to cause the polymers of the formulation(s) to soften or melt (e.g., temperature within the range from 120° C. to 230° C., such as from a low of any one of 120, 130, 140, 150, or 160° C. to a high of any one of 200, 220, 250, or 280° C. with ranges from any high end to any low end contemplated herein). This heating temperature may be referred to as a first bubble temperature, e.g. to indicate the desired temperature for forming the first bubble. The heat may be provided using any known technique or equipment; and the extruder may have a constant temperature or may have a temperature gradient (e.g., multiple zones defined along the length of the extruder, each zone with an associated temperature).

For (b) inflating or expanding the extrudate to form a first bubble: as shown in the example of FIG. 1, the extrudate tube 3020 is cooled or quenched (e.g., using a water ring 3030, which provides temperature-controlled (e.g., chilled) water on the outer surface of extrudate feed line 3020). A downwardly-extending first bubble 3035 is then formed by introducing air into the interior of the extrudate tube 3020. For example, air may be injected through the die orifice in sufficient quantity to cause the extrudate to expand into a bubble of a desired diameter. As described in U.S. Patent Publication No. 2014/0147646, the film thickness is controlled by Blow Up Ratio (BUR), take-off speed and output. The BUR for blown films can be within a range from a low of any one of 1, 1.5, 1.8, 2.0, or 2.2 to a high of any one of 3, 3.5, 5, 8, or 10. The die gap can be within a range from a low of any one of 0.5, 0.8, or 1.0 mm to a high of any one of 2, 3, 5, or 9 mm. Furthermore, it is noted that although first bubble 3035 is shown in FIG. 1 as a downward bubble, first bubble 3035 can in other embodiments be blown vertically upward.

Then, (c) the first bubble 3035 is collapsed (as shown in FIG. 1, by using rollers 3040 and 3045) to form a flattened tube 3055. Although FIG. 1 illustrates two sets of rollers 3040 and 3045, more rollers may be used in various assemblies. Further, any method suitable for cooling and collapsing the bubble may be used in addition to, or instead of, the rollers 3040 and 3045 illustrated in FIG. 1. For instance, the bubble may be quenched by using water, for example, in the form of a cascade spray and/or immersion bath and/or one or more rollers may be used to flatten the bubble. Alternatively, cool air may be blown on the collapsed/collapsing bubble, while the warm air is extracted via the exhaust pipe. Also or instead, the bubble 3035 collapsing into the flattened tube 3055 can be simultaneously cooled on the outside by a dual lip air ring. This air ring provides the main cooling and sets the frost line. The cooling air can be refrigerated in a heat exchanger connected to the chilled water circuit of the site. The bubble 3035 may be stabilized in a calibration basket, wherein the bubble then enters the collapsing stage.

Then, (d) the flattened tube 3055 is again heated to make it soft, preferably by heating to a higher temperature than what is reached in the extruding (a). This may be referred to as heating to a second bubble temperature, which temperature is higher than the temperature reached in the extruding (a).

Together with or immediately following the heating (d), the flattened tube is (e) reinflated or re-expanded to form a second bubble. The second bubble can be larger than the first bubble (e.g., higher diameter), and furthermore may be stretched biaxially (for instance at the same stretching ratio in both the machine direction and the transverse (or cross) direction). In yet other instances, however, the second bubble may be of varying size as compared to the first bubble. Further, the orientation of the film obtained from the process can be defined by a combination of the output of the extruders, the winder speed and the width of the second bubble versus the first bubble.

As illustrated in FIG. 1, the heating (d) and (e) re-inflating take place together. Air is blown into the interior of the now-expanding flattened tube 3055 to re-inflate it downward into second bubble 3065 (larger than the first bubble 3035) while it is being heated. As shown in the example of FIG. 1, a series of multiple heaters are used (heaters 3060 and 3068), which enables either uniform heating or heating via different temperatures, e.g., to establish a heating gradient along the second bubble 3065. For example, the oven temperatures can vary in small increments, such as about +/−10° C., or about +/−5° C., or about +/−2° C. (comparing ovens from one pair to the next, e.g., pair 3060 to pair 3068). Additional pairs of ovens may be used, or a single oven. In many instances, the oven is an infrared heater, and may define a hollow cylinder encompassing much of the vertical distance of the flattened tube 3055 as it expands into the bubble 3065.

The bubble is then (f) collapsed. As part of the collapsing, the bubble is preferably cooled (e.g., using an air ring, such as air ring 3075, illustrated in FIG. 1 as a simplified cross-section); then it is collapsed, e.g., using nip rolls 3080. Optionally, one or more thickness scanners 3070 may be employed to monitor thickness of the second bubble 3065 (e.g., for control of the process). Multiple sets of nip rolls 3080 (not illustrated in FIG. 1) may be used. The resulting film is then wound onto roll 3099.

In various embodiments, the double-bubble process may further comprise one or more of: (i) annealing the film; (ii) slitting the film to form a plurality of films (e.g., before rolling onto the roller 3099).

The processes described above in connection with FIG. 1 are provided for illustrative purposes. Other useful double-bubble extrusion techniques are disclosed, for example, in U.S. Pat. Nos. 3,456,044 and 6,423,420; and U.S. Patent Publication Nos. 2012/0164421 and 2014/0147646, which are herein incorporated by reference for this purpose.

Thus, summing up more generally, the present disclosure encompasses methods for forming a multilayer polymeric film, comprising: (a) extruding or coextruding one or more polymeric formulations (preferably two or more polymeric formulations) at an extruding temperature to form an extrudate, wherein the polymeric formulation(s) are in accordance with one or more of the skin formulations and core formulations described above; (b) inflating the extrudate to form a first bubble; (c) collapsing the first bubble to form a flattened tube; (d) heating the flattened tube to a second bubble temperature (the second bubble temperature preferably being greater than the extruding temperature, and greater than the softening point of each polymer in the polymeric formulation(s)); (e) inflating the flattened tube to form a second bubble; and (f) collapsing the second bubble to obtain the multilayer polymeric film. The second bubble is preferably larger in diameter than the first bubble, and the multilayer polymeric film is preferably biaxially oriented (e.g., where biaxial stretching is employed in the second bubble formation).

In particular, the polymeric formulation(s) employed in such processes can include two skin formulations A and one core formulation B, such that a three-layer polymeric film of A/B/A structure is formed after (f) collapsing the second bubble. The two skin formulations A may be the same or different in terms of their composition; where different, they may be referred to as skin formulations A and A', and the film can be specifically referred to as having A/B/A' structure to delineate the two compositionally different skin layers A and A'. However, the generic structure A/B/A does not necessarily mean the two skin layers A are the same, unless context clearly indicates otherwise.

As noted, the skin formulations A can be the same in terms of their composition. Thus, polymeric formulations(s) can be referred to more simply as including one skin formulation A and one core formulation B. and the formulations are coextruded such that the in three-layer polymeric film of A/B/A structure (where both A layers are of same composition) is formed after (f) collapsing the second bubble.

Two or more extruders may be used in such coextrusion processes, and two extruders are preferably used where the compositionally same skin formulation A is used for both skin layers (e.g., one extruder for skin formulation A, and one for core formulation B). In yet other embodiments, three extruders may be used (e.g., one extruder for a first skin formulation A, a second extruder for a second skin formulation A'), or four, and so on (e.g., with one extruder per different formulation to be used in making a different layer of the film).

In even further embodiments, a five-layer polymeric film may be formed (e.g., by employment of one or more skin formulations and one or more core formulations for coextrusion). Five layer films may take on A/B/A/B/A structure, for instance, or A/A/B/A/A, or A/B/B/B/A (again, where A is a skin layer, and/or a layer made from a skin formulation, as described herein, and the composition of any two A layers may be the same or different with respect to each other, and B is a core layer and/or layer made from core formulation as described herein). The film structure will typically depend on the method of coextrusion employed, which the ordinarily skilled artisan will be well equipped to select based upon the desired layer structure.

Likewise, expansion to seven or more layers is further contemplated herein. Thus, generally speaking, the multilayer film obtained by the process just described may have two or more, preferably three or more layers, and the layers may comprise any combination of skin layers A and core layers B as described herein, and in any order, provided that a skin layer A forms each outer layer of the film (e.g., the film is of A/ . . . /A structure), and further provided at least one core layer B is disposed between the outer skin layers A. Each skin layer A may be the same (e.g., formed from the same or identical skin formulation) or different (e.g., different skin layers such that each skin layer is, individually, within the description of a skin layer A as provided herein), and likewise for core layers B.

Applications

The ordinarily skilled artisan will appreciate that the formulations and films formed therefrom as described herein may be employed in any suitable films application. These include, e.g., extrusion, co-extrusion, casting, and/or lamination films. Particularly contemplated herein are packaging, such as shrink packaging, hand or pallet wraps, food and non-food packaging, and in particular barrier packaging (whether moisture barrier, vapor barrier, or both), along with other similar articles for which films (and in particular oriented films) are well-suited. These and other useful items for instance include packaging materials for medical devices or food which is irradiated including trays, as well as stored liquid, such as water, milk, or juice containers including unit servings and bulk storage containers.

EXAMPLES

Three-layer films were made according to one of six formulations in a double-bubble production process. The films had formulations according to Tables 1 to 6, respectively, below. In the film formulations, ENABLE™ 4002MC and EXCEED™ XP 6026ML (both available from ExxonMobil Chemical Company) are examples of LCB mLLDPE; EXCEED™ 1012MA is an example of a narrow-CD mLLDPE; HTA 108 (ExxonMobil™ HTA 108 HDPE) is an example of HDPE; and Lupolen™ 2420D LDPE (available from Lyondell Basell) is an example of LDPE, in accordance with the foregoing description. PPA is a polymer processing additive, specifically DYNAMAR™ FX5929 Polymer Processing Additive from 3M. Note that wt % s in Tables 1-6 are on the basis of all ingredients except the PPA; while PPA is in terms of phr (parts per hundred parts resin).

TABLE 1

Example 1 film formulation
A/B/A with layer distribution 15/70/15

| Ingredient | Skin Layer A contents | Core Layer B contents | Skin Layer A contents |
|---|---|---|---|
| HTA108 (wt %) | — | — | — |
| Exceed 1012MA (wt %) | 30 | — | 30 |
| Enable 4002MC (wt %) | — | 70 | — |
| Exceed XP 6026ML (wt %) | 40 | — | 40 |
| ExxonMobil ™ 2420D LDPE (wt %) | 30 | 30 | 30 |
| PPA (phr) | 1 | 1 | 1 |

TABLE 2

Example 2 film formulation
20 μm A/B/A with layer distribution 15/70/15

| Ingredient | Skin Layer A contents | Core Layer B contents | Skin Layer A contents |
|---|---|---|---|
| HTA108 (wt %) | — | — | — |
| Exceed 1012MA (wt %) | — | 30 | — |
| Enable 4002MC (wt %) | 70 | — | 70 |
| Exceed XP 6026ML (wt %) | — | 40 | — |
| ExxonMobil ™ 2420D LDPE (wt %) | 30 | 30 | 30 |
| PPA (phr) | 1 | 1 | 1 |

TABLE 3

Example 3 film formulation
20 μm thickness A/B/A with layer distribution 15/70/15

| Ingredient | Skin Layer A contents | Core Layer B contents | Skin Layer A contents |
|---|---|---|---|
| HTA108 (wt %) | 15 | — | 15 |
| Exceed 1012MA (wt %) | — | 30 | — |
| Enable 4002MC (wt %) | 65 | — | 65 |
| Exceed XP 6026ML (wt %) | — | 40 | — |
| ExxonMobil ™ 2420D LDPE (wt %) | 20 | 30 | 20 |
| PPA (phr) | 2 | 2 | 2 |

TABLE 4

| Example 4 film formulation<br>Thickness: 16 μm; A/B/A with layer distribution 30/40/30 | | | |
|---|---|---|---|
| Ingredient | Skin Layer A contents (kg) | Core Layer B contents (kg) | Skin Layer A contents (kg) |
| HTA108 (wt %) | — | — | — |
| Exceed 1012MA (wt %) | 50 | — | 50 |
| Enable 4002MC (wt %) | — | — | — |
| Exceed XP 6026ML (wt %) | — | 100 | — |
| ExxonMobil ™ 2420D LDPE (wt %) | 50 | — | 50 |
| PPA (phr) | 4 | — | 4 |

TABLE 5

| Example 5 film formulation<br>Thickness: 16 μm; A/B/A with layer distribution 30/40/30 | | | |
|---|---|---|---|
| Ingredient | Skin Layer A contents (kg) | Core Layer B contents (kg) | Skin Layer A contents (kg) |
| HTA108 (wt %) | — | — | — |
| Exceed 1012MA (wt %) | 50 | — | 50 |
| Enable 4002MC (wt %) | — | 20 | — |
| Exceed XP 6026ML (wt %) | — | 80 | — |
| ExxonMobil ™ 2420D LDPE (wt %) | 50 | — | 50 |
| PPA (phr) | 4 | — | 4 |

TABLE 6

| Example 6 film formulation<br>Thickness: 16 μm; A/B/A with layer distribution 30/40/30 | | | |
|---|---|---|---|
| Ingredient | Skin Layer A contents (kg) | Core Layer B contents (kg) | Skin Layer A contents (kg) |
| HTA108 (wt %) | — | — | — |
| Exceed 1012MA (wt %) | 50 | — | 50 |
| Enable 4002MC (wt %) | — | 70 | — |
| Exceed XP 6026ML (wt %) | — | | — |
| ExxonMobil ™ 2420D LDPE (wt %) | 50 | 30 | 50 |
| PPA (phr) | 4 | — | 4 |

Properties

Shrink (Betex shrink), reported as a percentage, was measured by cutting circular specimens from a film using a 50 mm die. The samples were then put on a copper foil and embedded in a layer of silicon oil. This assembly was heated by putting it on a 150° C. hot plate (model Betex) until the dimensional change ceased. An average of four specimens is reported. A negative shrinkage number indicates expansion of a dimension after heating when compared to its preheating dimension. Samples 4, 5 and 6 were also tested in the same manner at 110° C. and 130° C. (in addition to 150° C.). Further, tensile properties (1% secant modulus, tensile strength, and elongation at break %) were measured per ASTM D-882 in the MD and TD for each example Some samples (Ex. 1-3) were additionally tested for tear strength (Elmendorf Tear, ASTM D1922-09), and others (Ex. 4-6) for holding force. Finally, these properties are compared against a commercial sample of incumbent double-bubble shrink film made with a polyethylene-hexene core (DOWLEX™ 2045 polyethylene available from Dow Chemical Company) between two ter-polypropylene (TF400™ propylene-ethylene-butene from Hanwha Total Petrochemical Company) skin layers (C-Ex. 1), having 20 micron thickness and 3/4/3 layer ratio. The various property measurements are reported in Table 7 below. Film thickness is reported for each film tested for (1) shrink, (2) MD tensile properties, (3) TD tensile properties, (4) MD tear, and (5) TD tear.

TABLE 7

| Properties of Examples 1-6 | | | | | | | |
|---|---|---|---|---|---|---|---|
| Property | Ex. 1 | Ex. 2 | Ex. 3 | Ex. 4 | Ex. 5 | Ex. 6 | C-Ex 1 |
| Shrink | | | | | | | |
| Thickness | 18.5 μm | 16.7 μm | 18.8 μm | 16 μm | 16 μm | 16 μm | 19.8 μm |
| Shrink MD (@) 150° C. (%) | 98.2% | 98.2% | 98.1% | 81.8% | 82.3% | 81.7% | 97.6% |
| Shrink TD @ 150° C. (%) | 96.5% | 97.0% | 96.2% | 75.8% | 68.3% | 71.0% | 96.7% |
| Shrink MD @ 130° C. (%) | — | — | — | 82.0% | 81.0% | 78.3% | — |
| Shrink TD @ 130° C. (%) | — | — | — | 69.2% | 67.3% | 72.2% | — |
| Shrink MD @ 110° C. (%) | — | — | — | 59.2% | 39.3% | 16.0% | — |
| Shrink TD @ 110° C. (%) | — | — | — | 65.0% | 46.7% | 23.2% | — |
| MD Tensile | | | | | | | |
| Thickness | 19.2 μm | 12.8 μm | 18.8 μm | 16 μm | 16 μm | 16 μm | 18.2 μm |
| 1% sec mod MD (MPa) | 232 | 602 | 312 | 351 | 378 | 585 | 835 |
| Tens. Strength MD (MPa) | 62.2 | 93.0 | 57.4 | 94.8 | 98.4 | 68.9 | 169.3 |

TABLE 7-continued

| Properties of Examples 1-6 | | | | | | | |
|---|---|---|---|---|---|---|---|
| Property | Ex. 1 | Ex. 2 | Ex. 3 | Ex. 4 | Ex. 5 | Ex. 6 | C-Ex 1 |
| Elong.@break MD (%) | 151 | 144 | 129 | 195 | 146 | 137 | 89 |
| TD Tensile | | | | | | | |
| Thickness | 20.6 μm | 14.7 μm | 18.8 μm | 16 μm | 16 μm | 16 μm | 17.8 μm |
| 1% sec mod TD (MPa) | 364 | 670 | 422 | 414 | 439 | 580 | 1025 |
| Tens. Strength TD (MPa) | 64.9 | 97.4 | 58.2 | 132.4 | 89.9 | 81.3 | 131.3 |
| Elong. @break TD (%) | ?98 | 80 | 105 | 117 | 137 | 117 | 88 |
| MD Tear | | | | | | | |
| Thickness | 18 μm | 15 μm | 15 μm | — | — | — | 16 μm |
| Elmendorf Tear, MD (g) | 14.2 | 7.2 | 6.4 | — | — | — | 6.6 |
| Elmendorf Tear. MD (g/μm) | 0.8 | 0.5 | 0.4 | — | — | — | 0.4 |
| TD Tear | | | | | | | |
| Thickness | 17 μm | 18 μm | 15 μm | — | — | — | 15 μm |
| Elmendorf Tear, TD (g) | 14.9 | 7.8 | 7.7 | — | — | — | 4.4 |
| Elmendorf Tear, TD (g/μm) | 0.9 | 0.4 | 0.5 | — | — | — | 0.3 |
| Holding Force | | | | | | | |
| Thickness | — | — | — | 16 μm | 16 μm | 16 μm | 20 μm |
| Holding force MD, 230° C. (mN) ISO14616 | — | — | — | 272 | 256 | 426 | — |
| Holding force TD, 230° C. (mN) ISO14616 | — | — | — | 577 | 432 | 487 | — |

DISCUSSION

The data demonstrate that all-PE films of the examples provided defensible and acceptable properties for double-bubble shrink films, while providing the substantial advantage of being all-PE based (other than the minor amounts of PPA).

Examples 2 and 3 (employing narrow-CD mLLDPE in the core layer) achieved equivalent shrink, acceptably high tensile properties, and superior tear resistance to the incumbent comparative example.

Even greater tear resistance was achieved with Example 1, employing a blend of narrow-CD mLLDPE and second variant LCB mLLDPE in the skin layer, and first variant LCB mLLDPE in the core layer; although it is noted that these gains came at the cost of tensile properties, with Example 1 showing less stiffness and tensile strength.

Examples 4, 5, and 6 (employing LCB mLLDPEs in the core layers and not the skin layers, while keeping the narrow-CD mLLDPE in the skin layers) demonstrated lower shrink values but on average (and especially for Exs. 5 and 6) higher tensile properties, especially in TD.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term “comprising” is considered synonymous with the term “including” for purposes of United States law. Likewise whenever a composition, an element or a group of elements is preceded with the transitional phrase “comprising,” it is understood that we also contemplate the same composition or group of elements with transitional phrases “consisting essentially of,” “consisting of,” “selected from the group of consisting of,” or “is” preceding the recitation of the composition, element, or elements and vice versa.

While the present disclosure has been described with respect to a number of embodiments and examples, those skilled in the art, having the benefit of this disclosure, will appreciate that other embodiments can be devised which do not depart from the scope and spirit of the present disclosure.

We claim:

1. A multi-layer film comprising at least two skin layers and at least one core layer disposed directly or indirectly between the at least two skin layers, wherein the multi-layer film comprises:

(a) a narrow-CD metallocene linear low density polyethylene (narrow-CD mLLDPE) comprising 85 to 95 wt % units derived from ethylene and the balance derived from a $C_3$ to $C_{12}$ α-olefin (said wt % based on total mass of polymer in the narrow-CD mLLDPE), and further having: Composition Distribution Breadth Index (CDBI) of at least 50%, melt index ($I_2$, determined per ASTM D1238 at 190° C., 2.16 kg load) within the range from 0.1 to 3.0 g/10 min, molecular weight distribution (MWD, Mw/Mn) within the range from 1.5 to 4, peak melting temperature within the range from 105° C. to 120° C., and Vicat softening temperature within the range from 70° C. to 130° C.; and (b) a long-chain-branched metallocene linear low density polyethylene (LCB mLLDPE) comprising 80 to 99 wt % units derived from ethylene and the balance derived from a $C_3$ to $C_{12}$ α-olefin (said wt % based on total mass of polymer in the LCB mLLDPE), and further having: CDBI of at least 50%, 12 (190° C., 2.16 kg load) within the range from 0.1 to 0.7 g/10 min, g' (vis) within the range from 0.85 to 0.95, MWD within the range from 2.5 to 5.5;

(c) optionally, either or both of (c-1) a low density homopolyethylene (LDPE) having density within the range from 0.915 to 0.930 g/cm$^3$ and (c-2) a high-density polyethylene (HDPE) having density greater than or equal to 0.935 g/cm$^3$; and (d) optionally, a polymer processing additive;

wherein the narrow-CD mLLDPE (a) and the LCB mLLDPE (b) are included in different layers with respect to one another;

wherein the LCB mLLDPE is a first LCB mLLDPE, and the skin layers each comprise the first LCB mLLDPE; and the core layer comprises (i) the narrow-CD mLLDPE and (ii) a second LCB mLLDPE;

wherein the multi-layer film is biaxially oriented; and wherein, of the total polymeric content of the film, at least 95 wt % of such total polymeric content is composed of polyethylenes.

2. The film of claim 1, wherein:

the first LCB mLLDPE has peak melting temperature within the range from 115° C. to 135° C., Vicat softening temperature within the range from 110° C. to 130° C., and density within the range from 0.930 to 0.950 g/cm$^3$; and the second LCB mLLDPE has peak melting temperature within the range from 100° C. to 114° C., Vicat softening temperature within the range from 95° C. to 109° C., and density within the range from 0.910 to 0.929 g/cm$^3$.

3. The film of claim 1, wherein: (i) each layer further comprises the LDPE; and/or (ii) each layer further comprises the HDPE.

4. The film of claim 1, wherein, of the total polymeric content of the film, at least 97 wt % of such total polymeric content is composed of polyethylenes.

5. The film of claim 4, wherein the film comprises 1 to 4 phr of the polymer processing additive.

6. The film of claim 4, wherein all of the polymeric content of the film is composed of polyethylenes.

7. The film of claim 1, wherein the multi-layer film is formed by a blown film process.

8. The film of claim 1, wherein the blown film process comprises a double-bubble blown film process.

9. A multi-layer film comprising at least two skin layers and at least one core layer disposed directly or indirectly between the at least two skin layers, wherein the multi-layer film comprises:

(a) a narrow-CD metallocene linear low density polyethylene (narrow-CD mLLDPE) comprising 85 to 95 wt % units derived from ethylene and the balance derived from a $C_3$ to $C_{12}$ α-olefin (said wt % based on total mass of polymer in the narrow-CD mLLDPE), and further having: Composition Distribution Breadth Index (CDBI) of at least 50%, melt index ($I_2$, determined per ASTM D1238 at 190° C., 2.16 kg load) within the range from 0.1 to 3.0 g/10 min, molecular weight distribution (MWD, Mw/Mn) within the range from 1.5 to 4, peak melting temperature within the range from 105° C. to 120° C., and Vicat softening temperature within the range from 70° C. to 130° C.; and (b) a long-chain-branched metallocene linear low density polyethylene (LCB mLLDPE) comprising 80 to 99 wt % units derived from ethylene and the balance derived from a $C_3$ to $C_{12}$ α-olefin (said wt % based on total mass of polymer in the LCB mLLDPE), and further having: CDBI of at least 50%, $I_2$ (190° C., 2.16 kg load) within the range from 0.1 to 0.7 g/10 min, g'(vis) within the range from 0.85 to 0.95, MWD within the range from 2.5 to 5.5;

(c) optionally, either or both of (c-1) a low density homopolyethylene (LDPE) having density within the range from 0.915 to 0.930 g/cm$^3$ and (c-2) a high-density polyethylene (HDPE) having density greater than or equal to 0.935 g/cm$^3$; and (e) optionally, a polymer processing additive;

wherein the narrow-CD mLLDPE (a) and the LCB mLLDPE (b) are included in different layers with respect to one another;

wherein the multi-layer film is biaxially oriented;

wherein, of the total polymeric content of the film, at least 95 wt % of such total polymeric content is composed of polyethylenes, and wherein the LCB mLLDPE is a first LCB mLLDPE, and the core layer comprises the first LCB mLLDPE; and the skin layers each comprise (i) the narrow-CD mLLDPE and (ii) a second LCB mLLDPE.

10. The film of claim 9, wherein:

the first LCB mLLDPE has peak melting temperature within the range from 115° C. to 135° C., Vicat softening temperature within the range from 110° C. to 130° C., and density within the range from 0.930 to 0.950 g/cm$^3$; and the second LCB mLLDPE has peak melting temperature within the range from 100° C. to 114° C., Vicat softening temperature within the range from 95° C. to 109° C., and density within the range from 0.910 to 0.929 g/cm$^3$.

11. A multi-layer film comprising at least two skin layers and at least one core layer disposed directly or indirectly between the at least two skin layers, wherein the multi-layer film comprises:

(a) a narrow-CD metallocene linear low density polyethylene (narrow-CD mLLDPE) comprising 85 to 95 wt % units derived from ethylene and the balance derived from a $C_3$ to $C_{12}$ α-olefin (said wt % based on total mass of polymer in the narrow-CD mLLDPE), and further having: Composition Distribution Breadth Index (CDBI) of at least 50%, melt index ($I_2$, determined per ASTM D1238 at 190° C., 2.16 kg load) within the range from 0.1 to 3.0 g/10 min, molecular weight distribution (MWD, Mw/Mn) within the range from 1.5 to 4, peak melting temperature within the range from 105° C. to 120° C., and Vicat softening temperature within the range from 70° C. to 130° C.; and (b) a long-chain-branched metallocene linear low density polyethylene (LCB mLLDPE) comprising 80 to 99 wt % units derived from ethylene and the balance derived from a $C_3$ to $C_{12}$ α-olefin (said wt % based on total mass of polymer in the LCB mLLDPE), and further having: CDBI of at least 50%, $I_2$ (190° C., 2.16 kg load) within the range from 0.1 to 0.7 g/10 min, g'(vis) within the range from 0.85 to 0.95, MWD within the range from 2.5 to 5.5;

(c) optionally, either or both of (c-1) a low density homopolyethylene (LDPE) having density within the range from 0.915 to 0.930 g/cm$^3$ and (c-2) a high-density polyethylene (HDPE) having density greater than or equal to 0.935 g/cm$^3$; and (e) optionally, a polymer processing additive;

wherein the narrow-CD mLLDPE (a) and the LCB mLLDPE (b) are included in different layers with respect to one another;

wherein the multi-layer film is biaxially oriented;

wherein, of the total polymeric content of the film, at least 95 wt % of such total polymeric content is composed of polyethylenes, and wherein at least one of the at least two skin layer comprises the narrow-CD mLLDPE and the core layer comprises the LCB mLLDPE.

12. The film of claim 11, wherein the at least one of the at least two skin layers further comprises the LDPE.

13. The film of claim 11, wherein the LCB mLLDPE is a first LCB mLLDPE, and further wherein the core layer comprises the first LCB mLLDPE and a second LCB mLLDPE, and further wherein the first LCB mLLDPE has peak melting temperature within the range from 115° C. to 135° C., Vicat softening temperature within the range from 110° C. to 130° C., and density within the range from 0.930 to 0.950 g/cm$^3$; and the second LCB mLLDPE has peak melting temperature within the range from 100° C. to 114° C., Vicat softening temperature within the range from 95° C. to 109° C., and density within the range from 0.910 to 0.929 g/cm$^3$.

* * * * *